(12) United States Patent
Gouselis

(10) Patent No.: US 6,192,771 B1
(45) Date of Patent: Feb. 27, 2001

(54) OPERATING SYSTEM FOR A VEHICLE TRANSMISSION

(75) Inventor: Michail Gouselis, Kleinaitingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/240,710

(22) Filed: Feb. 2, 1999

(30) Foreign Application Priority Data

Feb. 11, 1998 (DE) .............................................. 198 05 510

(51) Int. Cl.$^7$ .................................................. B60K 20/04
(52) U.S. Cl. .................................. 74/473.34; 74/471 XY; 74/473.33
(58) Field of Search ........................... 74/473.33, 473.34, 74/473.35, 471 XY

(56) References Cited

U.S. PATENT DOCUMENTS

| | | | |
|---|---|---|---|
| 2,026,444 | * 12/1935 | Trott | 74/473.34 X |
| 2,040,594 | * 5/1936 | Bixby | 74/473.34 |
| 4,086,822 | * 5/1978 | Kuroda | 74/473.34 X |
| 4,132,124 | * 1/1979 | Iida | 74/473.34 |
| 5,025,677 | * 6/1991 | Muller et al. | 74/473.34 X |
| 5,313,853 | * 5/1994 | Olmsted et al. | 74/473.34 |
| 5,921,141 | * 7/1999 | Gouselis | 74/473.33 |

FOREIGN PATENT DOCUMENTS

| | | |
|---|---|---|
| 549487 | 4/1932 | (DE) . |
| 39 09 014 A1 | 9/1990 | (DE) . |
| 195 13 810 A1 | 10/1996 | (DE) . |
| 196 32 859 A1 | 2/1998 | (DE) . |
| 0750138 A2 | 12/1996 | (EP) . |

OTHER PUBLICATIONS

European Search Report 198 05 510.2 Jun. 14, 1999.

* cited by examiner

Primary Examiner—Rodney H. Bonck
(74) Attorney, Agent, or Firm—Evenson, McKeown, Edwards & Lenahan, P.L.L.C.

(57) ABSTRACT

An operating system for a vehicle transmission has a shifting lever which, for the shifting between gear ratios, can be swivelled in one shifting channel respectively about a shifting axle essentially in the longitudinal direction of the vehicle and, for selecting between different shifting channels, can be swivelled in at least one selecting channel about a selecting axle essentially in the transverse direction of the vehicle. A motion transmission connects the shifting lever with at least one transmission control shaft of a vehicle transmission. The shifting lever is mounted on a vehicle-body-fixed vehicle part, and the motion transmission consists, in a projection onto a shifting plane, of at least one parallelogram guide made of four bars, of which during a shifting and/or selecting movement of the shifting lever, three bars are changed in their position and a fourth bar maintains its position and, swivellably in the shifting plane, is mounted at its one end on a vehicle-body-fixed vehicle part and, at its other end, is rotatable in all directions by way of a third bar of the parallelogram guide by way of a ball joint. The fourth bar is movably connected with the vehicle transmission case by a supporting rod by at least so many degrees of freedom that any spatial movement of the vehicle transmission case is possible without causing reaction forces in the motion transmission. The other end of the fourth bar is linked to the supporting rod by way of another ball joint.

12 Claims, 4 Drawing Sheets

OPERATING SYSTEM FOR A VEHICLE TRANSMISSION

BACKGROUND OF THE INVENTION

This application claims the priority of German application 198 05 510.2, filed in Germany on Feb. 11, 1998, the disclosure of which is expressly incorporated by reference herein.

The present invention relates to an operating system for a vehicle transmission having a shifting lever which, for the shifting between gear ratios, is movably mounted on vehicle-body-fixed vehicle part of a motor vehicle, so as to be swivelled in one shifting channel respectively about a shifting axle essentially in the longitudinal direction of the vehicle and, for selecting between different shifting channels, is swivellable in By at least one selecting channel about a selecting axle substantially in a transverse direction of the vehicle, and which, by way of a motion transmission, is connected with at least one transmission control shaft of the vehicle transmission.

A vehicle transmission case is linked to the motion transmission and, in a projection onto a shifting plane, consists of at least one parallelogram guide made of four bars, one bar being fixedly connected with the shifting lever, and, during a shifting and/or selecting movement of the shifting lever, three bars being changed in their position and a fourth bar maintaining its position which, on its one end, is swivellably mounted in the shifting plane on a vehicle-body-fixed vehicle part and, on its other end, can be rotated in all directions by means of a third bar of the parallelogram guide by way of a ball joint and is movably connected with the vehicle transmission case by a supporting rod by at least so many degrees of freedom that any spatial movement of the vehicle transmission case is possible without causing reaction forces in the motion transmission. The bar of the parallelogram guide maintains its position which is fixedly connected with the shifting lever, and the other three bars of the parallelogram guide are changed in their position, wherein the other end of the fourth bar is linked to the supporting rod by way of another ball joint.

DE 196 32 859 A1 describes an operating system for a motor vehicle transmission having a shifting lever which, for the shifting between gear ratios, is movably mounted on a motor vehicle, in particular, can be swivelled in one shifting channel respectively about a shifting axle essentially in the longitudinal direction of the vehicle and, for selecting between different shifting channels, can be swivelled in at least one selecting channel about a selecting axle essentially in the transverse direction of the vehicle.

By way of a motion transmission, the known shifting lever is connected with at least one transmission control shaft of the vehicle transmission, a vehicle transmission case being linked to the motion transmission. Also, the shifting lever is mounted on a vehicle part fixed to the vehicle body and, in a projection onto a shifting plane, the motion transmission consists of at least one parallelogram guide consisting of four bars. One bar is fixedly connected with the shifting lever, and during a shifting and/or selecting movement of the shifting lever, three bars are changed in their position and one bar maintains its position. On its one end, this bar is swivellably mounted in the shifting plane on a vehicle-body-fixed vehicle part and, on its other end, is movably connected with the vehicle transmission case by at least so many degrees of freedom that any spatial movement of the vehicle transmission case is possible without causing reaction forces in the motion transmission. That bar maintains its position which is fixedly connected with the shifting lever and the other three bars are changed in their position.

In this known case, the three bars of the parallelogram guide, which are changed in their position during a shifting and/or selecting movement of the shifting lever, in a projection onto the shifting plane, are formed of a first bar between the shifting axle and at least a first connection joint to a coupling element, of at least a second bar between the first connection joint and at least a second connection joint to a connection element, and of a third bar between the second connection joint and a third connection joint to a fourth bar. The fourth bar is that bar of the parallelogram guide which maintains its position during a shifting and/or selecting movement of the shifting lever. The first bar is formed by the shifting lever, the second bar is formed by the coupling element, and the third bar is formed by the connection element.

The fourth bar is swivellably linked about a fastening axle on its one end to a vehicle-body-fixed vehicle part and, on its other end, can rotatably in all directions about the third connection joint be mounted on the connection element. From its other end, the connection to the vehicle transmission case is established by a supporting rod, and the connection element is mounted on the fourth bar by way of a third ball joint.

This known operating system has the advantage that the shifting lever maintains its position while the vehicle transmission can move in any spatial direction. Thus, vibrations of the transmission are also effectively intercepted in front of the manual shifting lever. The disadvantages are, however, a high-expenditure construction and a costly manufacturing which are the result of the fact that the fourth bar, which maintains its position, consists of an upper holding element part and a lower holding element part and both holding element parts are connected by a joint such that they are rotatable with respect to one another about a longitudinal holding element axle. The supporting rod leading to the vehicle transmission case is swivellably mounted on the fourth bar and the swivel axis extends through the center point of the third ball joint.

SUMMARY OF THE INVENTION

It is, therefore, an object of the present invention to produce the fourth bar, which maintains its position, and its connection to the vehicle transmission case and to the third bar of the parallelogram guide in a simpler manner so that the motion transmission can be manufactured at lower cost.

According to the invention, this object has been achieved by providing that the other end of the fourth bar is linked to the supporting rod by another ball joint.

This arrangement has the advantage that the connection of the fourth bar to the vehicle transmission case and to the third bar of the parallelogram guide has a simpler configuration and, as a result, the motion transmission can be produced at lower cost.

A still simpler configuration and, therefore, an even lower-cost production of the operating system is advantageously achieved in the additional embodiments of the present invention.

This is specifically true, if the connection of the other end of the fourth bar with the supporting rod and with the third bar of the parallelogram guide is constructed as a double ball joint, such that all mutually connected parts can be swivelled in all directions about the same rotational center point.

The same is true if the other end of the fourth bar is constructed as a holding ring, in which a ball of the additional ball joint or of the ball joint is rotatably held. This ball, which is provided with a recess, is constructed as a hollow ball and an additional ball of the ball joint or of the additional ball joint is rotatably held in this recess.

This is also true if the fourth bar is swivellably linked about a fastening axle on its one end linked to a vehicle-body-fixed vehicle part and is rotatably about the third connection joint in all directions on its other end mounted on the connection element, and if at least one element, particularly the shifting lever and/or the bars of the motion transmission, consists of a plastic material.

In further advantageous embodiments of the invention, the haptic aspects of the operating system are influenced in a targeted manner, whereby a secure shifting feeling is achieved for the driver which avoids insecurities during the shifting as well as any wrong shifting.

In one advantageous embodiment, the haptic aspects of the operating system are influenced in that at least one bearing point constructed as a joint of at least one element is configured so that it influences the haptic aspects as a result of its frictional action.

This can take place in that the frictional action is influenced by friction elements which increase the friction, particularly by their surface quality; or in that the frictional action is influenced by friction elements which reduce the friction, particularly by joints having a play.

It is particularly advantageous for the shifting reliability if the bearing point of the shifting lever is constructed such that its swivelling movement in the longitudinal direction for the shifting is damped by increased friction. It may, in addition, be configured such that the swivelling movement of the shifting lever in the transverse direction for the selecting is damped by increased friction.

The haptic aspects of the operating system are also positively influenced if, with the joint consisting of the ball and the hollow ball, for the connection of the supporting rod with the third bar, the ball is disposed by way of a cage in the hollow ball. This cage is spring-loadingly mounted, in the longitudinal direction of the supporting rod, in the recess of the hollow ball with play. In a particularly simple embodiment of the present invention, the spring loading of the cage is generated by a rubber element.

Other objects, advantages and novel features of the present invention will become apparent from the following detailed description of the invention when considered in conjunction with the accompanying drawings.

DETAILED DESCRIPTION OF THE DRAWINGS

First, the individual components of the operating system for a vehicle transmission are explained with reference to FIG. 1. The operation of the individual components is then described while also referring to FIGS. 2, 4 and 6.

Figure 1:
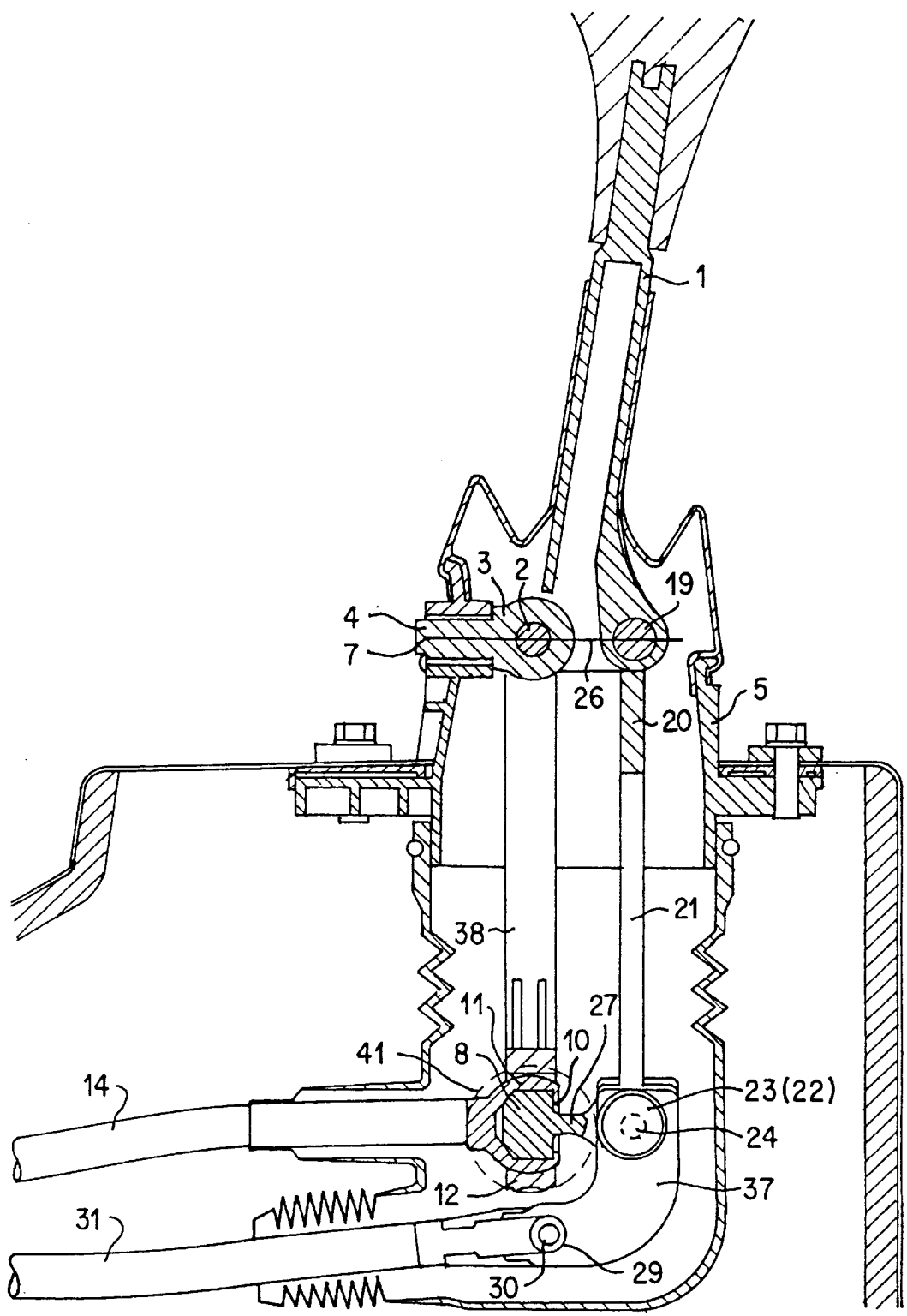
FIG. 1 is a partial sectional view of an operating system for a vehicle transmission in a shifting plane according to the present invention.

In FIG. 1, reference numeral 1 designates a shifting lever which is swivellably mounted about a shifting axle 2 and a selecting axle 4 so as to be mounted fixedly to the vehicle body on a console 5 by way of a shifting axle receiving system 3. Swivelling of the shifting lever 1 operates a coupling element which consists of two coupling rods 20, 21, of which only one is visible in FIG. 1, and which, by way of first ball joints 17, 18 (FIGS. 4 and 6), which are not visible in FIG. 1, are connected with the shifting lever 1. The first axle 19, which connects the first ball joints 17 and 18, extends parallel to the shifting axle 2. The coupling rods 20, 21, in turn, are fastened by way of second ball joints 22, 23, which are also congruent in FIG. 1, to a connection element constructed as an angle lever 37. The coupling element is configured such that the first axle 19 extends parallel to a second axle 24, which is the connection axle of the second ball joints 22, 23, indicated by a dot-dash imaginary line (in FIG. 6).

The connection element constructed as an angle lever 37 is movably connected by way of a third ball joint 8 with a supporting rod 14. This supporting rod 14 is movably mounted on a holding element 38 by way of another ball joint 11. This connection of the other end of the fourth bar, thus of the other end of the holding element 38, with the supporting rod 14 and with the third bar of the parallelogram guide, thus the angle lever 37, is constructed as a double ball joint. Thereby, all mutually connected parts can be swivelled in all directions about the same rotational center point. For this purpose, the other end of the holding element 38 is configured as a holding ring 12 in which a ball of the additional ball joint 11 is rotatably held. This ball has a recess 10 which is constructed as a hollow ball. In this recess 10, an additional ball of the third ball joint 8 is rotatably held.

Figure 6:
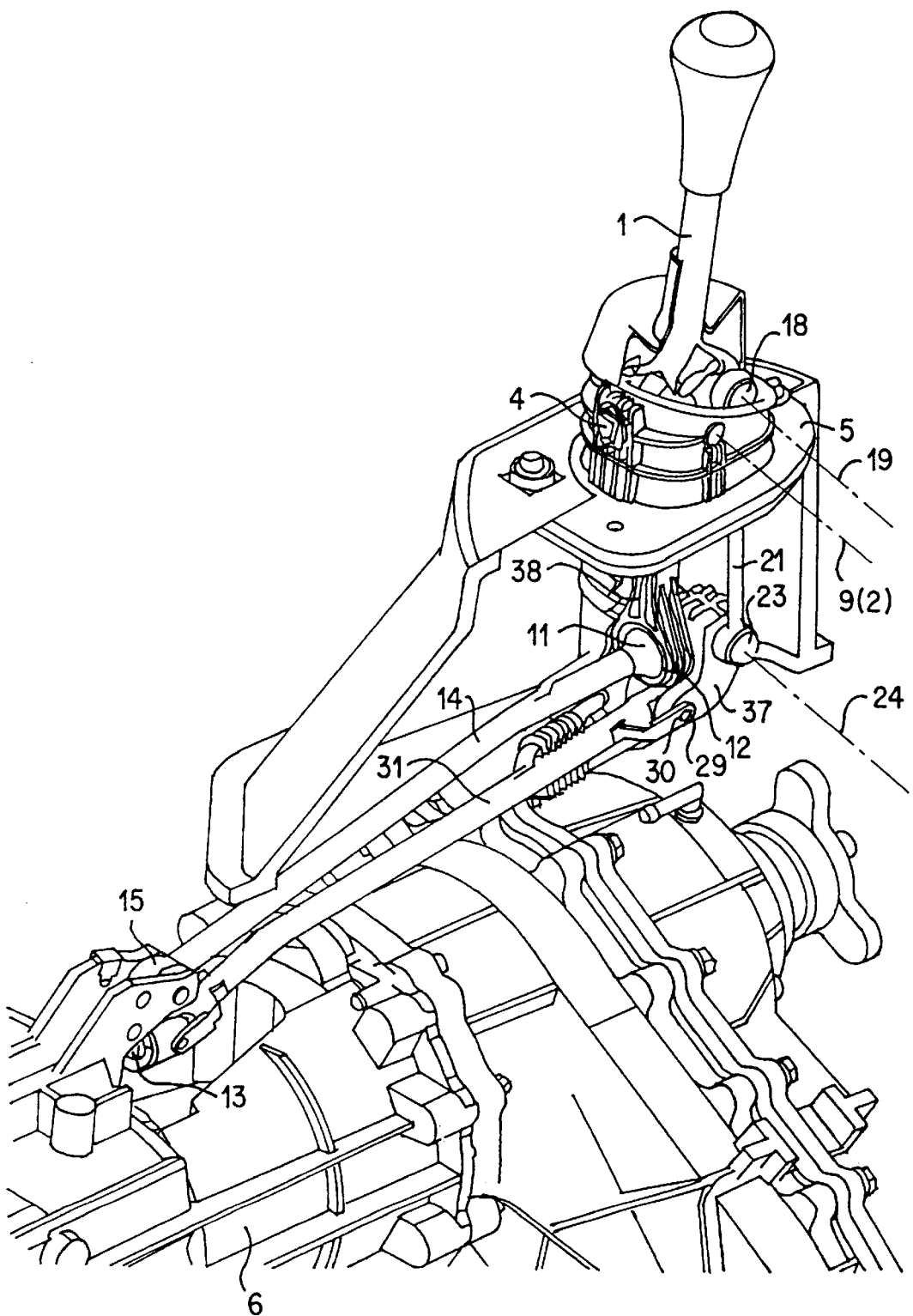
FIG. 6 is a perspective view of the operating system of the present invention together with a part of the vehicle transmission.

The supporting rod 14 represents a swivellable connection to a vehicle transmission case 6 as seen in FIG. 6. In addition, the end of a first leg 29 of the angle lever 37 carries a shift rod 31 swivellably disposed about a third axle 30. This shift rod 31 is the connection, which carries out the shifting movement, to a transmission control shaft 13 of the vehicle transmission. The second axle 24 and the third axle 30 are parallel to one another.

Figure 2:
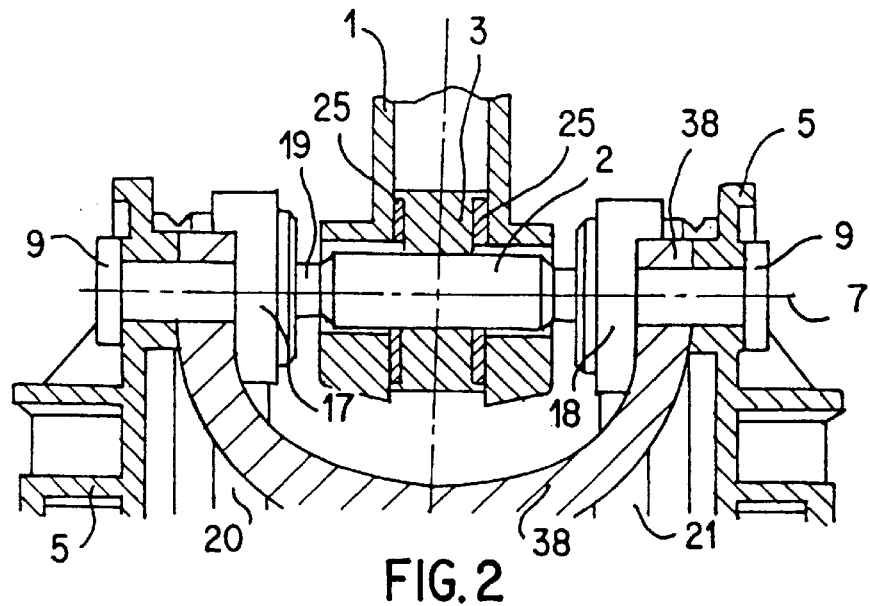
FIG. 2 is partial sectional view of an operating system for a vehicle transmission of the type shown in FIG. 1, but in a selecting plane.

On one end of the holding element 38 the angle lever 37 and the supporting rod 14 are mounted by way of the double ball joint consisting of the third ball joint 8 and the additional ball joint 11. Another end of the holding element 38 is swivellably mounted about a fastening axle 9 on the console 5 as seen in FIGS. 2 and 6. When the shifting lever 1 is not deflected in the selecting direction, the shifting axle 2 and the fastening axle 9 extend coaxially but, during a movement of the shifting lever 1 in the selecting direction, are uncoupled from one another.

FIG. 1 shows more clearly together with FIG. 2 that, by way of the selecting axle 4, the shifting axle receiving system 3 is swivellably disposed on a console 5 fixed to the vehicle body. The shifting lever 1 can be operated in the shifting direction about the shifting axle 2. The shifting axle 2 is disposed in the shifting axle receiving system 3 so that the shifting lever 1 can be swivelled about the selecting axle 4. In the selecting direction, the shifting lever 1 and the shifting axle receiving system 3 are jointly rotated about the selecting axle 4. The shifting lever 1 has two degrees of freedom; the shifting axle and the selecting axle 4 are disposed perpendicularly on one another and are situated on a joint plane 7. The present invention also contemplates that the shifting lever 1 can be disposed in the plane 7 by way of a ball joint in the console 5.

For shifting between transmission ratios, the movement of the shifting lever 1 is transmitted by way of a motion transmission to the transmission control shaft 13. In a projection onto a shifting plane, viewed corresponding to FIG. 1, the motion transmission consists of at least one parallelogram guide consisting of four bars, a first bar 26 being formed by the shifting lever 1, a second bar being formed by the coupling element, and a third bar being formed by the connection element. The fourth bar of the parallelogram guide is formed by the holding element 38 which maintains its position during a shifting and/or selecting movement of the shifting lever 1.

FIG. 2 clearly illustrates that one end of the holding element 38 is swivellably disposed by way of the fastening axle 9 in the console 5. The shifting axle 2 and the fastening axle 9 are coaxial with respect to one another when the shifting lever 1 is in its illustrated neutral position. The third ball-joint 8 can rotate together with the holding element 38 as a pendulum about the fastening axle 9, whose axis of rotation is congruent with the shifting axle 2 visible in FIG. 1 when, as illustrated, the shifting lever 1 is not deflected in the selecting direction.

On its transmission-side end, the supporting rod 14 is fastened by an additional elastic joint 15 to the vehicle transmission case as seen in FIG. 6. The distance of the third ball joint 8 from the additional elastic joint 15 and thus also from the vehicle transmission case 6 is therefore defined. The elastic joint 15 itself has three degrees of freedom so that the supporting rod 14 can absorb only pressure and tension forces but no torques. In this manner, the holding element 38 is movably connected on its other end with the vehicle transmission case 6 by at least so many degrees of freedom that any spatial movement of the vehicle transmission case 6 is possible without causing any reaction forces in the motion transmission, with the first bar 26 maintaining its position, and the other three bars, i.e., the holding element 28, the second leg 27 and the coupling element, being changed in their position.

Figure 4:
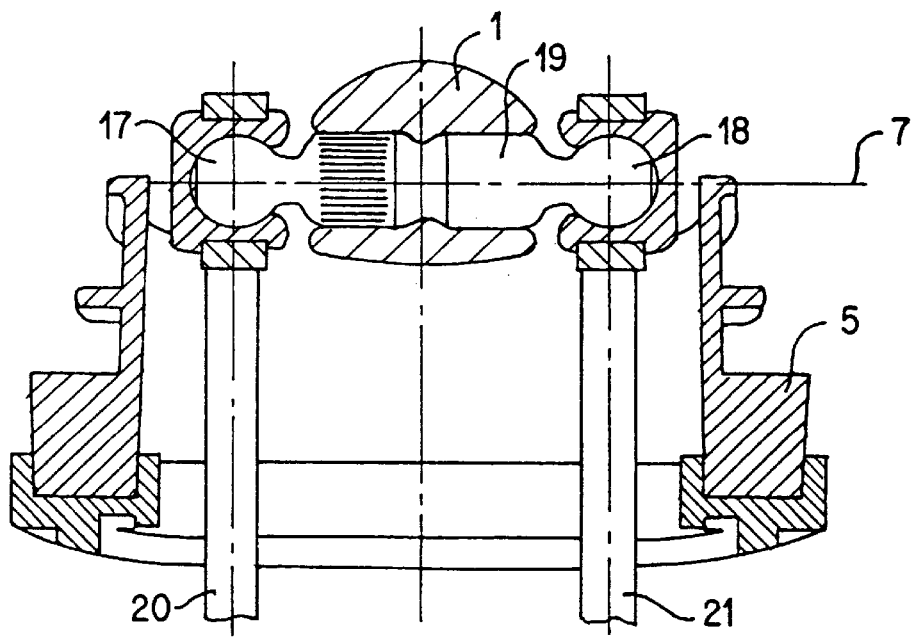
FIG. 4 is a partial sectional view of another embodiment an operating system for a vehicle transmission in a selecting plane according to the present invention.

The first ball joints 17, 18, as seen in FIGS. 4 and 6, as the first connection joint of the parallelogram guide, are fastened to the shifting lever 1, and their connection axle (the first axle 19) is parallel with the shifting axle 2 (see FIG. 1). The coupling element consisting of the coupling rods 20, 21 is fastened by way of the first ball joints 17, 18 to the first axle 19. The first ball joints 17, 18 have three degrees of freedom.

The other end of the coupling rods 20, 21 (see FIGS. 1 and 6) are connected by way of second ball joints 22, 23, as the second connection joint of the parallelogram guide, with the second axle 24 which extends parallel to the first axle. The two coupling rods 20, 21 can be parallel to one another. However, this is not absolutely necessary. If the two coupling rods 20, 21 are parallel, they form, together with the shifting lever 1 and the angle lever 37, another parallelogram guide in a plane perpendicular to the shifting plane. If, in contrast, the coupling rods 20, 21 are not parallel, the first ball joints 17, 18, together with the second ball joints 22, 23 mount a trapezoidal four-bar mechanism.

The first bar 26 of the parallelogram guide connects the first axle 19 with the shifting axle 2 of the shifting lever 1 (FIG. 1). The second leg 27 of the connection element, acting as the third bar of the parallelogram guide, connects the second axle 24 with the third connection joint, i.e., the ball joint 8. The first bar 26 is parallel to the third bar and perpendicular to the first axle 19. The third bar is also perpendicular to the second axle 24. The holding element 38, at the fourth bar of the parallelogram guide, which connects the console 5 in the shifting plane—congruent to the position of the shifting axle 2, with the third ball joint 8, is parallel to the plane mounted by the additional parallelogram guide. The first bar 26, the holding element 38 and the third bar are situated in the shifting plane which is perpendicular to the plane of the additional parallelogram guide and forms a parallelogram together with the coupling element. The distance of the first bar 26 from the first ball joints 17, 18 is identical. The distance of the third bar from the second ball joints 22, 23 is also identical. The third bar corresponds to the second leg 27 of the angle lever 37 and is rigidly connected with the first leg 29 of the angle lever 37.

The third axle 30 is perpendicular to the first leg 29 of the angle lever 37. The shift rod 31 is perpendicular to the third axle 30. The shift rod 31 must be perpendicular to the first leg 29 of the angle lever 37 only when the shifting lever 1 is in its installed position. The shift rod 31 is configured such that it can exercise forces only in the direction of the longitudinal axis and torques only about the longitudinal axis of the transmission control shaft 13. The transmission control shaft 13 therefore has two degrees of freedom.

When the shifting lever 1 is moved about the selecting axle 4, it rotates together with the shifting axle receiving system 3. This has the result that the first axle 19 is rotated by the first bar 26 also about the selecting axle 4. The first ball joints 17, 18 rotate about the selecting axle 4 with a radius which corresponds to half the length of the first axle 19 (FIG. 4). The coupling rods 20 and 21 convert this rotating movement into a straight movement. The second ball joints 22, 23 move on a circle about the second leg 27 with a radius which corresponds to half the length of the second axle 24. Since the third bar, the first leg 29 and the third axle 30 are formed by the angle lever 37 and are therefore rigidly connected with one another, they rotate about the third ball joint 8. The rotating radius A of the third axle 30 corresponds to its distance from the center point of the third ball joint 8. This rotating movement causes the transmission control shaft 13 to rotate by way of the shift rod 31 until the corresponding gear has been selected. The reaction forces of the selecting operation are transmitted by the holding element 38 to the fastening axle 9 and thus by way of the console 5 to a vehicle-fixed part, for example, the floor panel of the vehicle.

When the shifting lever 1 is moved in the shifting direction, it is rotated about the shifting axle 2. The first bar 26 causes the first axle 19 also to rotate about the shifting axle 2. The coupling rods 20, 21 convert this rotating movement into a straight movement. The third bar causes the second axle 24 to rotate about the third ball joint 8. The third axle 30 also rotates about the third ball joint 8. This rotating movement moves the transmission control shaft 13 in a straight line and shifts the corresponding gear. As the intermediate element, the shift rod 31 transmits this movement. The supporting rod 14 takes over a portion of the reaction forces during the shifting operation and is supported in this case on the vehicle transmission case 6. A portion of the reaction forces is transmitted by the holding element 38 to the fastening axle 9 and thus by way of the console 5 to a vehicle-fixed part, such as the floor panel of the vehicle. The first bar 26 must have the same length as the second leg 27.

In all driving conditions, particularly when driving on uneven roads, during a starting-stopping of the engine, during load change alterations on the transmission line and at high rotational engine speeds, the engine, together with the vehicle transmission, carries out a translational movement and a rotational movement in the space. Because of the motion transmission, these relative movements of the transmission line with respect to the vehicle body are not transmitted to the shifting lever 1. The same applies to vibrations of the transmission line.

Figure 3:
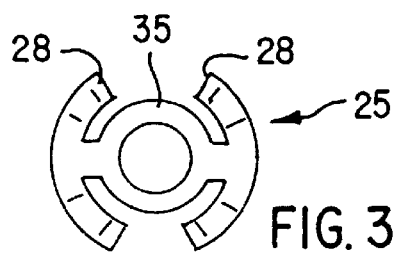
FIG. 3 is a view of a friction element for influencing the haptic aspects of the operating system of FIGS. 1 and 2.

The shifting lever 1, the holding element 38 and the coupling rods 20, 21 are made of plastic. With correspondingly lightly constructed elements of the motion transmission, the haptic aspects of the operating system can easily be influenced by the frictional action between the elements. As illustrated in FIG. 2, for this purpose, the bearing point of the shifting lever 1 on the shifting axle 2, which bearing point is constructed as a joint, is provided with friction elements, whose surface quality can increase the friction of the shifting lever 1 for its swivelling movement in the shifting direction. Two spring plates 25, which are installed between the shifting lever 1 and the shifting axle receiving device 3 and which rub by way of flexible tongues 28 against the shifting lever 1 and are supported by contact surfaces 35 on the shifting axle receiving device 3, are used as friction elements. Such a spring plate 25 is illustrated in FIG. 3. In this manner, the swivelling movement of the shifting lever 1 in the transverse direction for the purpose of selecting can also be damped by increased friction.

Figure 5:
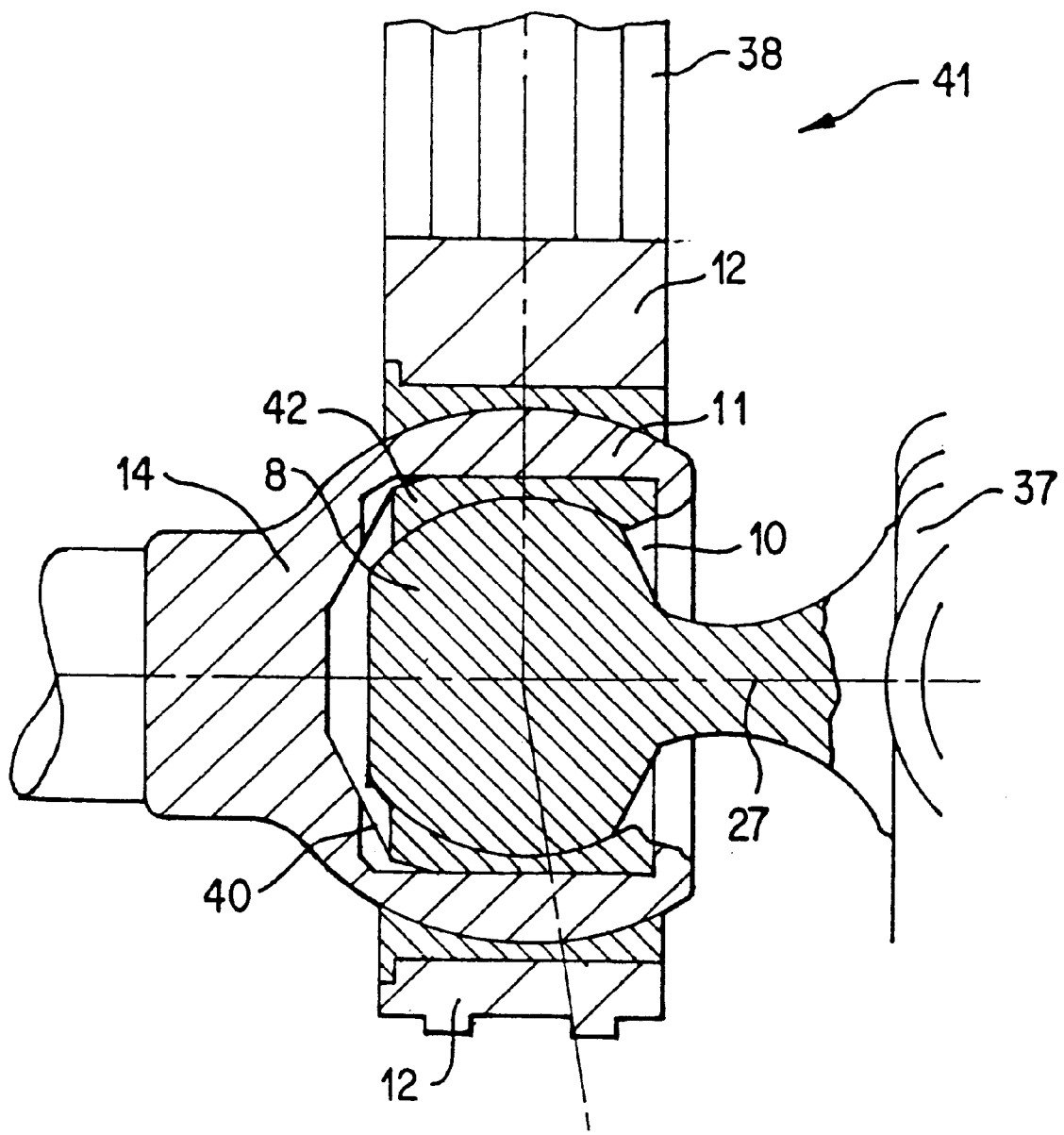
FIG. 5 an enlarged representation of the part 1 area designated by a dot-dash circle in FIG. 1.

In the double ball joint illustrated in FIG. 1 and FIG. 5, the frictional action is influenced by a friction element which reduces the friction, such as a ball joint 8 having play. With a joint consisting of a ball and a hollow ball, for connecting the supporting rod 14 with the angle lever 37, the ball is disposed by way of a cage 42 in the hollow ball. This cage 42 is mounted in the recess 10 of the hollow ball while having play and being spring-loaded in the longitudinal direction of the supporting rod 14, the spring loading being generated by a rubber element 40. This results in a lower preadjusted friction in the third ball joint 8 which prevents noise because the cage 42 can move in the recess 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle transmission having an operating system, comprising a shifting lever which, for shifting between gear ratios, is configured to be movably mounted on vehicle-body-fixed vehicle part of a motor vehicle, so as to be swivellable in one shifting channel respectively about a shifting axle arrangeable substantially in a vehicle longitudinal direction and, for selecting between different shifting channels, is swivellable in at least one selecting channel about a selecting axle arrangeable substantially in a vehicle transverse direction, and which, via a motion transmission, is connectable with at least one transmission control shaft of the vehicle transmission, a vehicle transmission case being linked to the motion transmission and, in a projection onto a shifting plane, comprising at least one parallelogram guide made of four bars, one bar being fixedly connected with the shifting lever, and, during a shifting and/or selecting movement of the shifting lever, three bars being changed in their position and a fourth bar maintaining its position which, on one end thereof, is swivellably mountable in a shifting plane on a vehicle-body-fixed vehicle part and, on another end thereof, is rotatable in all directions by a third bar of the parallelogram guide via a first ball joint with a first ball and is movably connected with the vehicle transmission case by a supporting rod by degrees of freedom sufficient so that spatial movement of the vehicle transmission case is effected without causing reaction forces in the motion transmission, the one bar of the parallelogram guide maintaining its position which is fixedly connected with the shifting lever, and the other three bars of the parallelogram guide being changed in their position, wherein the other end of the fourth bar is linked to the supporting rod by way of a second ball joint.

2. Vehicle transmission according to claim 1, wherein the connection of the another end of the fourth bar with the supporting rod and with the third bar of the parallelogram guide is a double ball joint configured so t-hat all mutually connected parts are swivellable in all directions about a shared rotational center point.

3. Vehicle transmission according to claim 2, wherein the another end of the fourth bar is a holding ring in which a second ball of the second ball joint or the first ball of the first ball joint is rotatably held, this ball being a hollow ball provided with a recess, and in recess, an additional ball of the ball joint or of the additional ball joint being rotatably held.

4. Vehicle transmission according to claim 1, wherein the fourth bar is arranged to be swivellable about a fastening axle linkable on one end thereof to a vehicle-body-fixed vehicle part and has another end rotatably mounted omni-directionally about a third connection joint.

5. Vehicle transmission according to claim 1, wherein at least one element, including the shifting lever and/or the bars of the motion transmission, are made of plastic material.

6. Vehicle transmission according to claim 1, wherein at least one bearing point constructed as a joint of at least one element is configured to influence haptic aspects of the operating system by friction.

7. Vehicle transmission according to claim 6, wherein the friction is influenced by friction elements whose surface increases the friction.

8. Vehicle transmission according to claim 6, wherein the friction is influenced by friction elements which are joints with play to reduce the friction.

9. Vehicle transmission according to claim 6, wherein the is bearing point of the shifting lever is configured such that swivelling movement thereof in a longitudinal shifting direction for the shifting is damped by an increased friction.

10. Vehicle transmission according to claim 6, wherein the bearing point of the shifting lever is configured such that swivelling movement thereof in a transverse selecting direction is damped by an increased friction.

11. Vehicle transmission according to claim 6, wherein, in a joint consisting of a ball and a hollow ball for connecting the supporting rod with the third bar, the ball is disposed in the hollow ball by a cage mounted in a recess of the hollow ball with play and in a spring-loaded manner in the longitudinal direction of the supporting rod.

12. Vehicle transmission according to claim 11, wherein the spring loading of the cage is generated by a rubber element.

* * * * *